METHOD OF MAKING A SPLIT RING
Filed March 21, 1963
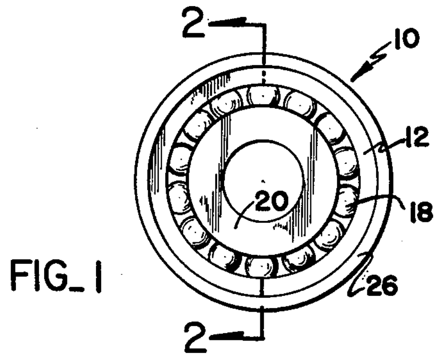
FIG_1
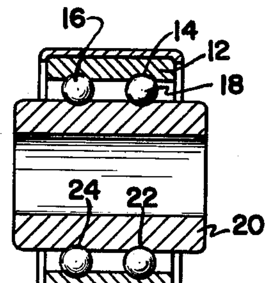
FIG_2
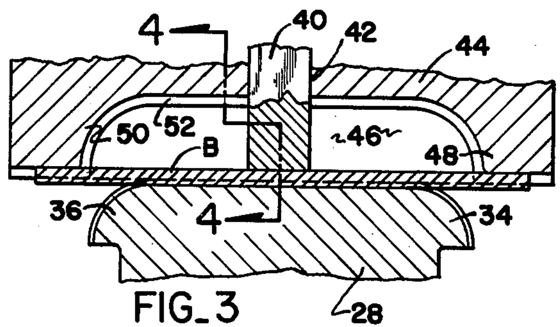
FIG_3
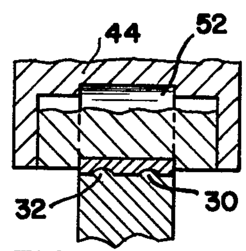
FIG_4
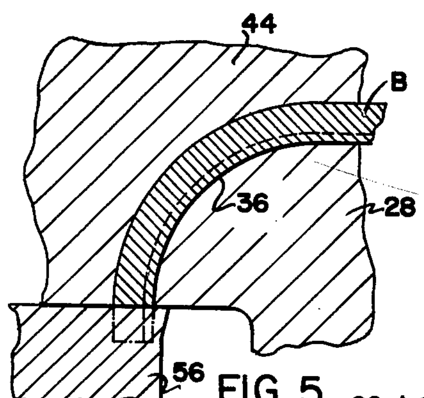
FIG_5
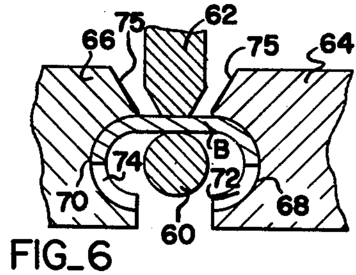
FIG_6
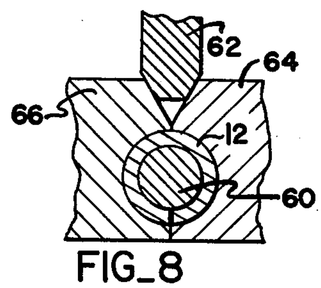
FIG_8
FIG_7
INVENTOR.
MICHAEL BUSHI
BY
Oberlin, Maky & Donnelly
ATTORNEYS

United States Patent Office 3,166,827

Patented Jan. 26, 1965

3,166,827

METHOD OF MAKING A SPLIT RING

Michael Bushi, 3268 W. 33rd St., Cleveland, Ohio

Filed Mar. 21, 1963, Ser. No. 266,969
5 Claims. (Cl. 29—148.4)

This invention relates in general to ball bearings and more particularly to a novel method of making the same.

In the manufacture of ball bearings of the type having one of the race members, generally the outer one, in the form of a split ring, accuracy has been a consistent and substantial problem which has not been satisfactorily solved. Present methods of forming the split ring have failed to solve the problem of accurately rounding the split ring, and as a result manufactured split rings are often imperfect in this regard.

It is accordingly a primary object of the present invention to provide a novel method of making ball bearings wherein the split ring race member is accurately formed and perfectly rounded.

A further object of the present invention is to provide a highly simplified and inexpensive method of making such ball bearings.

These and other objects and advantages of the present invention will become apparent as the following description proceeds.

To the accomplishment of the foregoing and related ends, the invention, then, comprises the features hereinafter fully described and particularly pointed out in the claims, the following description and the annexed drawings setting forth in detail certain illustrative embodiments of the invention, these being indicative, however, of but a few of the various ways in which the principle of the invention may be employed.

In said annexed drawings:

FIG. 1 is a ball bearing formed in accordance with the invention;

FIG. 2 is a sectional view taken on line 2—2 of FIG. 1;

FIG. 3 is a partially diagrammatic view of the metal blank from which the split ring is formed, immediately prior to the initial bending step;

FIG. 4 is a sectional view taken on line 4—4 of FIG. 3;

FIG. 5 is an enlarged view showing one end of the blank being formed around the forming die with the end thereof being cut and squared;

FIG. 6 is a diagrammatic showing of the partially formed blank retained in position over the forming mandrel immediately prior to the final forming step;

FIG. 7 is a view of the blank during the intermediate stage of the final forming step; and FIG. 8 is a view of the finally formed split ring.

Referring now to the drawings, wherein like parts are indicated by like reference characters, and particularly to FIGS. 1 and 2, the completed bearing assembly is generally indicated at 10 and comprises an outer race member 12 in the form of a split ring having in the form shown a pair of internal, spaced grooves 14 and 16 which form outer races for the balls 18. The grooves 14 and 16 are formed with radii corresponding to the radii of the balls 18. The bearing assembly 10 further includes an inner race member 20 provided with a pair of spaced grooves 22 and 24 on the outer cylindrical surface thereof, the radii of such grooves similarly corresponding to the radii of the balls 18. The above described assembly components are held in place by means of a retainer ring 26 disposed around the split ring 12 as shown in FIG. 2. Although in the form shown there are two ball-receiving raceways, it should be understood that the principles of the present invention in no way depend upon the number of raceways and that a single raceway or a number in excess of that shown could also be provided.

Referring now to the method of forming the split ring 12, to which the present invention particularly relates, and initially to FIGS. 3–5, an elongated metal blank B is provided from which the split ring is formed, the blank B being formed with the longitudinally extending, spaced grooves 14 and 16 which form the outer races as above described. The blank B is slightly greater in longitudinal dimension than the desired circumference of the split ring, such excess length approximating ¼ inch and being provided to enable the opposite ends of the blank to be trimmed and squared as hereinafter described. The blank B is placed on die block 28 which is formed with complemental spaced ribs 30 and 32 for receiving the grooves 14 and 16 of the metal blank B, the ribs 30 and 32 of the die block 28 functioning to prevent transverse movement of the blank B while disposed thereover. The die block 28 is shown diagrammatically and it will be understood that such die block is held in place by a die shoe (not shown) in a conventional manner. The ends of the die block 28 are curved as shown at 34 and 36, the radii of such curved portions corresponding to the desired radius of the split ring 12.

A reciprocating plunger 40 is provided to maintain the blank in position on the die block 28, the plunger 40 reciprocating in a bore 42 formed in an upper die member 44. The upper die 44 is formed with a downwardly opening cavity 46, the opposite ends of which are curved as indicated at 48 and 50, the radii of such curved portions corresponding to the radii of the curved end portions 34 and 36 of the die block 28. The cavity 46 of the upper die 44 is partially defined by a groove 52, the sides of which are spaced slightly greater than the width of the blank B whereby said blank B is received in said groove subsequent to the downward movement of the upper die 44. It will thus be seen that when the blank B is placed on the die block 28 with the grooves of the blank B and the ribs of the block 28 interengaged, movement of the plunger 40 to a position engaging the blank B and subsequent downward movement of the upper die 44 will effect a bending of the opposed end portions of the blank B about the curved end portions 34 and 36 of the die block 28, such bending step being shown in FIG. 5. Due to the blank B being of a length slightly in excess of the desired circumference of the split ring, the opposed ends of the blank will extend downwardly slightly below the bottommost portions of the curved end portions 34 and 36.

Immediately after the bending of the blank ends around the die block 28 as above described, trimmer or cutter members 56, only one of which is shown in FIG. 5, function to trim or cut the opposed ends of the blank B, as well as serving to exactly square such end portions. As will be understood, each of the trimmers 56 is mounted by means (not shown) providing for horizontal reciprocation thereof.

Subsequent to the initial bending and trimming steps described above and illustrated in FIGS. 3–4, the partially formed blank B is transferred to and positioned on a forming mandrel 60, a blank-holding member 62 being provided to maintain the blank B in position on the mandrel 60. The circumference of the mandrel 60 identically conforms with the desired inside diameter of the finished split rings. A pair of opposed forming dies 64 and 66 are mounted (by means not shown) for horizontal reciprocating movement toward and away from the forming mandrel 60 as indicated by the arrows in FIG. 6, each of said forming dies 64 and 66 being formed with cavities 68 and 70, respectively, which open toward the forming mandrel 60. Each of said forming dies 64 and 66 is additionally formed with grooves 72 and 74 similar to groove 52 in die 44 for receiving the blank B, and are beveled as indicated at 75 to accommodate the holder 62 when the dies 64 and 66 are in their innermost, FIG. 8 position. The radii of the cavities 68 and 70 correspond to the desired outside radius of the split ring 12.

FIGS. 6–8 show the sequential movement of the forming dies 66 and 68 toward the mandrel 60 and the final forming or wrapping of the blank B thereabout. It will be seen that as the forming dies 64 and 66 move inwardly toward the mandrel, the opposed ends of the blank B occupy an increasingly greater portion of the grooves 72 and 74 formed in the forming dies, until the completion of such forming or wrapping, referring to FIG. 8, at which time the blank B completely occupies such grooves. Subsequent to the final FIG. 8 forming step, the dies 66 and 68 are withdrawn, the blank holder 62 moved away from engagement with the now finally formed ring and the latter is removed by any suitable means from the mandrel 60.

There are several features of applicant's novel method which should be particularly noted. It will be seen that in the final forming step as illustrated in FIGS. 6–8, the entire blank with the exception of the very small area thereof immediately below the holder 62 is wrapped about the forming mandrel 60. It will be noted that during such wrapping the previously bent end portions of the blank merely slide in the grooves 72 and 74, respectively, because of the corresponding curvature therebetween, and the intermediate straight portion is bent around the mandrel, the radius of curvature of the mandrel being the same as the radius of curvature of the curved end portions 34 and 36 of the die block 28. It will further be apparent that during such wrapping of the substantially entire blank B, the curved portions of the blank B as well as the intermediate straight section are compressed whereby the adjacently disposed ends of the finally formed split ring 12 can be accurately formed and squarely aligned. In previous type methods for forming split rings, on the other hand, generally a major portion of the partially formed blank was clamped or held in place while the remaining portion was finally wrapped around the forming mandrel. This conventional method is objectionable in that by rigidly clamping the substantial or major portion of the partially formed blank while the free end portions are being wrapped around the forming mandrel, such end portions are placed under tension and thereby a strong tendency results for metal flow at the extreme free ends of such blank. This free flow of the blank ends is obviously undesirable and, in addition to impairing the accurate rounding of the split ring, adversely affects the aligning and squaring of the adjacently disposed free ends.

Other modes of applying the principle of the invention may be employed, change being made as regards the details described, provided the features stated in any of the following claims or the equivalent of such be employed.

I therefore particularly point out and distinctly claim as my invention:

1. The method of forming a split ring from an elongated straight metal blank comprising the steps of placing and retaining said blank on a lower die member having an intermediate straight section corresponding in length to one-half the desired circumference of said ring and opposed curved end sections each having a radius of curvature corresponding to the desired radius of said ring, bending said blank on said lower die member by a vertically reciprocable upper die member, the blank thus comprising curved end sections each having a radius of curvature corresponding to the desired radius of said ring and an intermediate straight section corresponding to one-half the desired circumference of said ring, trimming the opposite ends of said partially formed blank to square the same, positioning said partially formed blank on a cylindrical forming mandrel having a radius corresponding to the desired inside radius of said ring and retaining said blank thereon at a point midway on said intermediate straight section, and wrapping said curved end sections and said intermediate section about said cylindrical mandrel by horizontally reciprocating die members to closely conform said blank to the cylindrical surface of said mandrel.

2. The method of claim 1 wherein during the final wrapping of said blank around said mandrel said straight intermediate section is bent by said horizontally reciprocating die members to conform said intermediate straight section to the surface of said mandrel, the previously bent end portions of said blank being wrapped around said mandrel by said horizontally reciprocating die members without changing the radius of curvature thereof.

3. The method of forming a split ring from an elongated blank comprising the steps of bending the opposite ends of said blank to form a blank having an intermediate straight portion and curved end portions each having a radius corresponding to the desired radius of said ring, and bending said intermedaite straight portion around a forming mandrel having a radius corresponding to the desired radius of said ring while maintaining the radius of curvature of the previously bent end portions of said blank, the sequential bending operation on said blank thus forming a perfectly rounded split ring.

4. The method of claim 3 further including the step of severing said blank at the extreme ends thereof subsequent to the initial bending step to precisely square said ends.

5. The method of forming a split ring bearing race member from an elongated, straight blank having at least one longitudinally extending groove formed therein comprising the steps of bending the opposite ends of said blank on radii of curvature corresponding to the radius of said ring while maintaining an intermediate straight section the length of which corresponds to one-half the desired circumference of said ring, severing said blank at the extreme ends thereof subsequent to the initial bending step to precisely square said ends, placing said partially curved blank on a cylindrical mandrel having a radius corresponding to the desired inside radius of said ring and retaining said blank thereon at a point midway on said intermediate straight section, and wrapping said intermediate section and said curved section around said mandrel to closely conform to the cylindrical surface thereof.

References Cited by the Examiner

UNITED STATES PATENTS

| | | | |
|---|---|---|---|
| 1,924,230 | 8/33 | Davis | 153—2 X |
| 1,931,162 | 10/33 | Kranz et al. | 113—33 |
| 2,674,782 | 4/54 | Surtees | 29—149.5 |

WHITMORE A. WILTZ, *Primary Examiner.*

THOMAS H. EAGER, *Examiner.*